Feb. 17, 1925.
1,527,114
D. C. BRANDENBURG
COMBINED FUEL CONSUMPTION AND SPEED INDICATOR
Filed Jan. 20, 1921
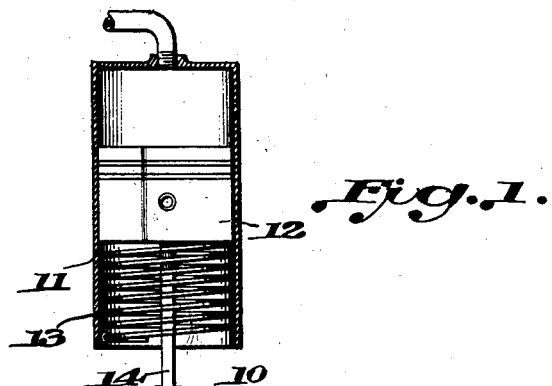
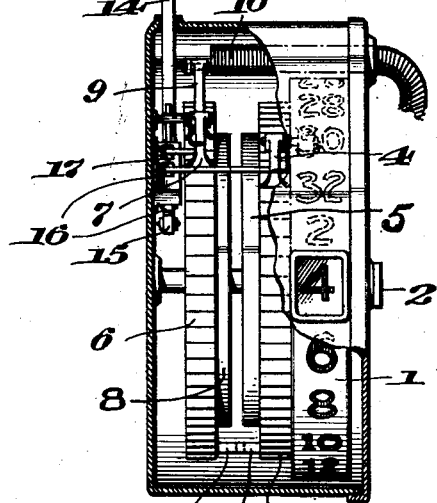
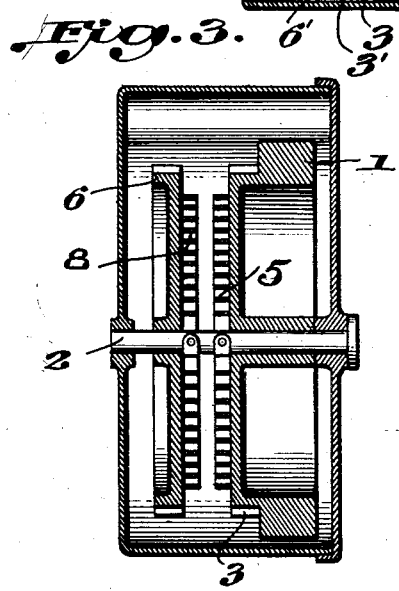
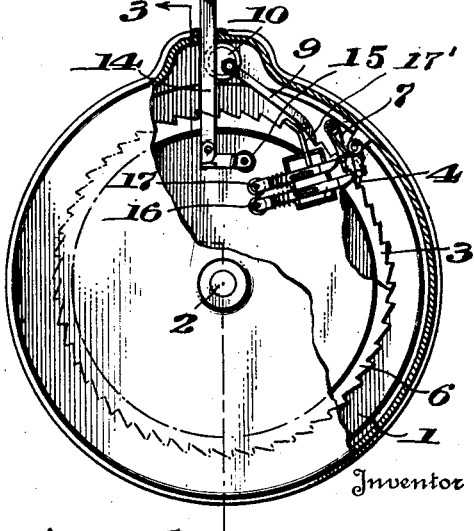
Inventor
Dudley C. Brandenburg
By E. C. Brandenburg
Attorney Patented Feb. 17, 1925.

1,527,114

UNITED STATES PATENT OFFICE.

DUDLEY C. BRANDENBURG, OF DENVER, COLORADO.

COMBINED FUEL-CONSUMPTION AND SPEED INDICATOR.

Application filed January 20, 1921. Serial No. 438,790.

*To all whom it may concern:*

Be it known that I, DUDLEY C. BRANDENBURG, a citizen of the United States, residing at Denver, in the county of Denver and State of Colorado, have invented certain new and useful Improvements in Combined Fuel-Consumption and Speed Indicators, of which the following is a specification.

This invention relates to a device for registering the rate of fuel consumption of an automobile or the like, with the speed of the mechanism, and the object of the invention is to combine a speed indicator with a fuel consuming indicator so as to indicate on a dial the gasoline consumption in exact terms of miles per gallon.

In the accompanying drawings:

Fig. 1 is a side elevation of the device partly broken away;

Fig. 2 is a front view of the device showing the cylinder and casing partly broken away;

Fig. 3 is a transverse vertical section on line 3—3 of Fig. 2.

This invention consists of a registering dial, which is actuated primarily by suitable means connected with the mechanism of the usual speedometer, in combination with an independent actuating mechanism controlled by the vacuum-feed system commonly known as a Stewart vacuum system. This system, it is understood, has the float which rises and falls with the passage of gas through it. Each full upward stroke of the float indicates the exact amount of gasoline taken in. The invention contemplates connecting this gasoline measuring instrument with a speed meter in such a way as to bring about a common reading in calibrated figures, namely miles per gallon.

In carrying this invention into practice in its preferred form, I provide a wheel 1, on the periphery of which readings are shown in miles per gallon. This wheel is mounted for rotation upon a shaft 2. 3, indicates a small ratchet-wheel which is integral with the miles-per-gallon-wheel 1; and 4, is a dog adapted to engage the ratchet-wheel 3 and normally hold it against rotation in one direction by the influence of a hair-spring 5. Loosely mounted on the shaft 2 is a second ratchet-wheel 6; and 7, is a similar dog which is adapted to engage the wheel 6 and normally hold it against rotation in one direction against the influence of the spring 8. Lugs 3' and 6' project inwardly from the ratchet-wheels 3 and 6, respectively, and abut, whereby the ratchet wheel 3 may be rotated by the ratchet 6.

9, indicates an actuating arm adapted to engage the wheel 6, the arm being actuated by a cam-shaft 10 secured to the speedometer (not shown). 11 illustrates a cylinder which is open at the lower end and connected at the upper end to the vacuum tank of any of the well-known varieties now in use. Within the cylinder is a plunger 12 held normally in its lower position by spiral spring 13. Connected to the plunger 12 is a rod 14, having attached to its outer end a dog-tripping mechanism 15. This dog-tripping mechanism is adapted to engage first a spring-actuated plunger 16 adapted to engage the dog 4, and a spring-actuated plunger 17 adapted to engage the dog 7 the plunger 17 having a vertically-extending trip member 17' adapted to engage the rod 9, the tripping mechanism being adapted to raise these dogs at certain intervals as more clearly hereinafter set forth.

Assuming that the miles-per-gallon-wheel makes one complete revolution to each two miles covered by the car, and supposing that in making one revolution the vacuum tank has emptied once, and that each time the float moves one pint of gas has passed through the tank, then we get the following equation:—Two miles per pint equal sixteen miles per gallon. Now if this miles-per-gallon-wheel is marked off in units of the above equation, we will find that if the wheel only makes half a turn, by the time the vacuum flow has moved once, we get the reading one mile per pint equals eight miles per gallon, and the reading will show eight miles.

The operation is as follows:—Assuming the miles-per-gallon-wheel 1 is already in such a position as to show sixteen miles per gallon through the opening in the dial of the speedometer, it is held in this position by the little dog 4, which engages the ratchet-wheel 3 integral with the miles-per-gallon-wheel 1. Now it will be seen that ratchet-wheel 6 and ratchet-wheel 3 must both turn at the same speed, as one pushes the other by means of the little lugs 3' and 6'. Assuming that the ratchet-wheel 6 has dropped back to the starting-point, it is slowly moved forward again by the arm 9, which is being continuously actuated by the speedometer. Assuming that it has gotten just half as far as the miles-per-gallon-wheel, which is already standing at sixteen miles a gallon, when the vacuum-tank takes in a new supply of gas causing the plunger 12 to rise, thereby actuating the tripping mechanism 15, it is so arranged that the tripping mechanism first comes in contact with plunger 16, thereby actuating the dog 4 that holds the miles-per-gallon-wheel at sixteen miles a gallon, the miles-per-gallon-wheel at once springs back by means of the hair spring 5, until the lug 3' thereon comes in contact with the lug 6' carried by the ratchet wheel 6. The miles-per-gallon-wheel will then read half of its previous reading, namely eight miles per gallon.

In the meantime, the tripping mechanism has passed on and moving the plunger 17 forward raised the little dog 7 on the ratchet-wheel 6 and the rod 9, allowing the ratchet-wheel to fly clear back for a fresh start, while the miles-per-gallon-wheel is still held at its last reading by the dog 4 which was lifted first.

Now suppose the next time it acts, instead of going half way, the ratchet-wheel 6 goes further and carries the miles-per-gallon-wheel with it, until it reads twenty miles per gallon. The vacuum tank again acts, and the tripping mechanism lifts the little dog 4 on the miles-per-gallon-wheel 1, just as before. It can not go back, because the lug 1' on the ratchet-wheel 6 is in contact with the lug 3', and the wheel is therefore held in that position by the dog 4, while the other ratchet-wheel 6 is again released in its turn, and flies back for another fresh start.

I claim:

1. An indicator for motor vehicles comprising an indicating rotary element, a secondary rotary element, lugs carried by said rotary elements, a lug carried by the secondary rotary element for imparting motion to the first-mentioned rotary element, retarding springs connected to said rotary elements to retard their movement in one direction, dogs adapted to engage said rotary elements to retract their movement in one direction, a pawl actuated by the speed-indicating device of the vehicles for imparting a rotary motion to the secondary rotary element, a tripping mechanism adapted to actuate said dogs and actuating pawl, whereby the rotary elements may turn in the opposite direction, and a plunger controlled by the fuel consumption of the motor vehicles adapted to actuate said tripping mechanism for determining the degree of rotation of the rotary indicating element.

2. An indicator for motor vehicles, comprising a rotary dial provided with ratchet teeth, a rotary ratchet-wheel alined therewith engaging lugs carried by the rotary elements, retarding springs connected with said rotary elements, a pawl actuated by the movement of the vehicle for imparting a rotary motion to the second rotary element, pivoted dogs adapted to engage said rotary element to retract their movement in one direction, a tripping means common to said pawl and dogs, and a tripping mechanism actuated by the fuel consumption of the motor vehicle at predetermined intervals for releasing said pawl and dogs consecutively.

3. An indicator for motor vehicles comprising a rotary dial provided with ratchet teeth, a rotary ratchet-wheel alined therewith engaging lugs carried by the rotary elements, retarding springs connected with said rotary elements, a pawl actuated by the movement of the vehicle for imparting a continuous rotary movement to the said ratchet-wheel, a retracting dog engaging said rotary dial, a retracting dog engaging said ratchet-wheel, a tripping means common to said pawl and retracting dogs, and a plunger actuated by the fuel supply of the vehicle for actuating said tripping means in the order mentioned for raising the pawl, the dog of the rotary dial and the dog of the ratchet-wheel.

4. An indicator for motor vehicles comprising a rotary dial provided with ratchet teeth, a rotary ratchet-wheel alined therewith engaging lugs carried by the rotary elements, retarding springs connected with said rotary elements, a pawl actuated by the movement of the vehicle for imparting a continuous rotary movement to the said ratchet-wheel, a retracting dog engaging said rotary dial, a retracting dog engaging said ratchet-wheel, a tripping means common to said pawl and retracting dogs, and a plunger actuated by the section occurring periodically in the vacuum tank of the vehicle for acuating said tripping means in the order mentioned for raising the pawl, the dog of the rotary dial and the dog of the ratchet-wheel.

In testimony whereof I affix my signature.

DUDLEY C. BRANDENBURG.